United States Patent Office 3,459,697
Patented Aug. 5, 1969

3,459,697
REACTION PRODUCT OF A POLYAMIDE, A HALOGENATED POLYOXYALKYLENE, AND AN EPIHALOHYDRIN
Alan August Goldberg and Dennis Wray, Ambergate, England, assignors to Precision Processes (Textiles) Limited, Ambergate, Derbyshire, England, a British company
No Drawing. Filed Mar. 22, 1966, Ser. No. 536,277
Claims priority, application Great Britain, Mar. 24, 1965, 12,567/65
Int. Cl. C08f 30/00; D06m 15/12
U.S. Cl. 260—29.2         11 Claims

ABSTRACT OF THE DISCLOSURE

Process for preparing cationic water-soluble resinous condensation products by reacting a water-soluble polyamide containing free secondary amino groups with a linear polyoxyalkylene compound having terminal reactive groups which react with secondary amino groups, the latter being used in an amount sufficient to react with 5 to 50% of the available secondary amino groups, and reacting the resultant product with epichlorohydrin. The cationic products are useful (a) to provide an antistatic finish upon artificial materials, more especially textile substrates and (b) to impart a shrink-resistant finish to keratinous materials such as wool.

---

This invention relates to the production of water-soluble cationic condensation products, to the coating of textile substrates therewith and to the thermal conversion of the condensation products into water-insoluble hydrophilic resinous materials.

It is known that fibres, films and fabrics formed from synthetic, linear polymeric hydrophobic thermoplastic materials develop electrostatic charges when subjected to friction. The development of such charges is undesirable since (a) garments woven from such materials tend to cling to the human body and do not drape in a normal manner and (b) garments woven from such materials and other shaped bodies exhibit a pronounced tendency to attract particles of dirt from the surrounding atmosphere and thus become much more readily soiled than similar garments formed from other materials. In the case of carpets woven from polyamide fibres, the electrostatic charge developed may become sufficiently powerful for a person wearing noninsulating footwear to receive a considerable electric shock when touching a metal door handle or similar conducting article.

It has been proposed in British specification No. 880,897 to prepare condensation products of polyamines and polyoxyethylene compounds for conversion into cross-linked insoluble hydrophilic resins which when deposited upon the surface of hydrophobic fibres prevent the accumulation of electric charge. For example, a linear polymer is prepared by condensing a polyethylene polyamine with a polyoxyethylene dichloride and then cross-linked by reaction with a component containing halogeno-epoxy groups, for example epichlorohydrin. Although the resulting resins give the fabric upon which they are deposited an antistatic finish they suffer from the important disadvantage of rendering the treated fabric very susceptible to pick-up of colour when washed in the presence of coloured materials. This is due to the fact that all the nitrogen atoms in the aforesaid cross-linked polymer exist in the tertiary and/or quaternary state and accordingly act as sites for the formation of bonds with molecules of dyestuffs; the treated fabrics are thus very liable to change colour during washing.

It is accordingly an object of the present invention to provide improved condensation products suitable for application to the surfaces of such thermoplastic materials which will modify the tendency to develop such pronounced electrostatic charges whilst being resistant to colour change during washing, and to treat textile substrates such as thermoplastic materials, therewith.

According to the present invention there is provided a process for producing a water-soluble cationic resinous condensation product which comprises reacting a linear water-soluble polyamide containing free secondary amino groups with a linear polyoxyalkylene compound having terminal reactive groups which react with secondary amino groups which polyoxyalkylene compound is present in an amount sufficient to react with 5 to 50% of the available secondary amino groups and then reacting the product with epichlorohydrin.

In producing the condensation products of the present invention there is used as a starting material a linear aliphatic polyamide containing a plurality of secondary amino groups which are separated by aliphatic hydrocarbon chains which may be interrupted by carbonamide groups.

The aliphatic polyamide containing a plurality of secondary amino groups is an at least sparingly water-soluble polyamide derived from a polyalkylene polyamine by reaction with an alkane dicarboxylic acid or a reactive functional derivative thereof thus converting the primary amino groups to carboxamide groups whilst the secondary amino groups remain substantially unchanged. The polyalkylene polyamines contain the unit —CHR.CH$_2$.NH— 

in which R is a hydrogen atom or an alkyl group, at least twice in the molecule. Examples of such polyamines are diethylene-triamine, triethylene tetramine, tetraethylene pentamine, dipropylene triamine and tripropylene tetramine. The polyalkylene polyamine may contain from two to eight alkylene groups.

The proportion of secondary amino groups may be reduced by reacting a mixture of polyamine and a diamine, such as tetramethylene diamine or hexamethylene diamine, with the aforesaid dicarboxylic acid or with a reactive functional derivative thereof. It thus becomes possible to use an alkylene diamine and one or more polyalkylene polyamines derived therefrom e.g. a commercial mixture, in a reaction with a dicarboxylic acid or a reactive functional derivative thereof. Such mixtures should contain at least 20% by weight of polyalkylene polyamines.

The alkane dicarboxylic acids employed in the procedures discussed above may have from 3 to 10 carbon atoms. Examples of such acids are succinic, glutaric, adipic, suberic and sebacic acids. When a functional derivative of such an acid is employed it is preferably an acid halide or ester thereof and may be an acid chloride or an acid bromide. The proportion of dicarboxylic acid or functional derivative thereof should be such as substantially completely to react with the primary amino groups present in the reactant or reactants but should not react with the secondary amino groups to any substantial extent. In general from 0.8 to 1.2 mols of alkane dicarboxylic acid or functional derivative thereof should be used for each mol of diamine (including polyalkylene polyamine).

In the first stage of the process of the invention a polyamide containing secondary amino groups is reacted with a linear polyoxyalkylene compound having reactive terminal groups. The parent polyoxyalkylene compound is one having the general formula X—CHR′—(OCHR—CHR′)$_n$—OCHR—X′ 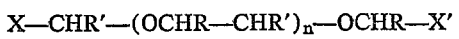

in which R and R' are selected from hydrogen atoms and hydrocarbon groups free from olefinic or acetylenic unsaturation, X is a group having one of the formulae —CHROH, and —COOH, X' is a group having one of the formulae —CHR'OH and —COOH and $n$ is an integer which is at least three. Preferably $n$ is 5 to 50 and most preferably 25 to 40. When R and R' in the above general formula are hydrocarbon groups they are preferably lower alkyl groups, more especially methyl groups, but may also be aryl groups such as phenyl or aralkyl groups such as benzyl. The preferred reactive terminal groups are those in which the alcoholic hydroxyl groups or the hydroxyl moiety of the carboxyl group are replaced by halogen atoms, especially chlorine.

The compounds having the above general formula are derived from the polyalkylene glycols, more especially the polyethylene glycols and the polypropylene glycols, having average molecular weights greater than 100 but usually not greater than 2500 and preferably not greater than 2000. These materials are mixtures which contain a number of compounds of differing molecular weight depending upon the average value of $n$ in the above general formula and have terminal primary alcoholic groups. These primary alcoholic groups can be converted into halomethyl groups by reacting with a halogenating agent such as thionyl chloride or phosphorus pentachloride or pentabromide to replace the alcoholic hydroxyl groups by halogen atoms and thus, for example, produce the corresponding compounds containing bis(chloromethyl) and bis(bromomethyl) groups. Alternatively the terminal groups can first be oxidised to carboxylic acid groups e.g. using nitric acid in the presence of an alkali metal metavanadate. The product is the corresponding terminal dicarboxylic acid and this may then be converted to the corresponding dicarboxylic acid dihalide by treatment with a halogenating agent such as any of those mentioned above.

As a further alternative the terminal hydroxyl groups may be converted to chloroformate groups —O.CO.Cl by reaction with phosgene.

As a still further alternative the terminal hydroxyl groups may be converted into —O.CH$_2$.CH(OH).CH$_2$Cl groups by reaction with epichlorohydrin. These products thus also contain terminal halomethyl groups.

Thus the compounds used as starting materials have at the extremities of the polyoxyalkylene chain either (a) a halomethyl group derived by the substitution of halogen for hydroxyl at the extremities of the polyoxyalkylene chain or by the addition of one mole of epichlorohydrin to the extremities of the chain or (b) an acid halide group derived by reaction of one mole of phosgene with the hydroxyl group at each extremity of the polyoxyalkylene chain or by oxidation of the terminal —CHROH or —CHR'OH groups to carboxyl groups followed by conversion to the acid halide.

The terminal halogen-containing polyoxyalkylene compounds are used in a proportion sufficient to react with 5–50% of the secondary amino groups present in the compounds containing such groups. Preferably 15–25% of the secondary amino groups are reacted in this manner.

In the case of the terminal bis(halomethyl) compounds the reaction with the linear polyamide containing secondary amino groups is conveniently carried out by heating the reactants preferably in the presence of an acid acceptor. Suitable acid acceptors include the alkali metal bicarbonates and carbonates. The reaction is conveniently carried out by heating in solution in a solvent, suitable solvents including the liquid polyethylene and polypropylene glycols which have average molecular weights of 200–400 optionally diluted with water.

In the case of the dicarboxylic acid dihalides and the bis(chloroformates) the reaction with the linear compound containing secondary amino groups is conveniently effected at room temperature or slightly raised temperature in the presence of an acid acceptor. The reaction may be carried out in the presence of an inert diluent if desired.

The first stage of the process of the invention leads to the production of condensation products in which molecules of the linear starting material are linked at tertiary nitrogen atoms with polyoxyalkylene chains. The product still retains 50–95% of the secondary amino groups present in the starting material from which it is derived.

In the second stage of the process of the invention at least the greater part of the remaining secondary amino groups are reacted with epichlorohydrin. It is preferred that sufficient epichlorohydrin should be used to react with substantially all the available secondary amino groups.

The subsequent reaction with epichlorohydrin leads to the production of further tertiary nitrogen groupings and it is believed that this may be followed by partial cross-linking. For the present purpose it is desirable that reaction be terminated while the product retains a substantial solubility in water. The water solubility can be followed by observing the increase in viscosity of the reaction mixture. As the viscosity increases the water solubility diminishes.

If it is desired to store the resulting product for any considerable time it may be further reacted with a quaternising agent which is conveniently an alkyl ester of a mineral acid such as dimethyl or diethyl sulphate or methyl, ethyl or n-propyl chloride, bromide or iodide. From 30–50% of the amount theoretically necessary to quarternise all the tertiary nitrogen atoms is sufficient for this purpose.

An alternative and preferred procedure to quaternisation is to dilute the product with water until a 20–25% by weight solution is obtained followed by adjustment of the pH value of the solution to 5–6, preferably by addition of a hydrogen halide.

The reaction with epichlorohydrin may be effected by heating the reaction mixture to 40–90° C., preferably to 50–80° C. The proportion of epichlorohydrin empolyed may be somewhat in excess of that theoretically required to react with the secondary amino groups: accordingly we may employ 1.0–1.5 moles of epichlorohydrin for each secondary amino group.

The cationic resinous condensation products of the present invention are valuable coating materials which can be used to modify the surface properties of textile substrates such as the hydrophobic synthetic linear polymeric thermoplastic materials. Solutions of the cationic condensation products may readily be applied to the surface of shaped bodies from solution in a volatile solvent, preferably water, after which the solvent is evaporated and the resulting resinous film heat converted to water-insoluble form. The presence of the polyoxyalkylene chains in the molecules of the insolubilised resin imparts important and unusual properties to the water-insolubilised material. The oxygen atoms present in the oxyalkylene groups confer hydrophilic properties upon the insolubilised resin by virtue of the van der Waal's forces which attract water molecules present in the atmosphere to the oxygen atoms. In consequence electrostatic charges are unable to accumulate upon the surface of the insolubilised resin. The result is that treated materials are better conductors of electricity and have a lower electrical resistance than materials which have not been so treated.

The electrical resistances of specimens of typical fabrics have been determined when held in contact with two like copper plate electrodes 14 cm. long the separation between the electrodes being 3 mm. and the fabric having first been conditioned by maintenance for 24 hours in an atmosphere of 65% relative humidity at 20° C. Fabrics which have been treated with the resins of the invention and then subjected to typical after treatments which would be encountered in commercial production and in subsequent use were similarly tested. The following table gives typical results:

| Sample of Fabric: | Resistance (ohms) |
| --- | --- |
| (i) Bleached cotton | $1 \times 10^8$ |
| (ii) Woolen flannel | $6 \times 10^9 - 5 \times 10^{10}$ |
| (iii) Polyhexamethylene adipamide | c. $1 \times 10^{12}$ |
| (iv) Polyethylene terephthalate | c. $1 \times 10^{14}$ |
| (v) Polyacrylonitrile | c. $1 \times 10^{14}$ |
| (vi) Polyhexamethylene adipamide, polyethylene terephthalate and polyacrylonitrile treated according to the invention | $1.5 \times 10^9$ to $2.9 \times 10^9$ |
| (vii) Polyhexamethylene adipamide, polyethylene terephthalate and polyacrylonitrile treated according to the invention and then washed for 6 hours at 60° C. in 0.2% soap solution | $2.5 \times 10^9$ to $2.9 \times 10^9$ |
| (viii) Polyhexamethylene adipamide treated according to the invention and dyed at 90° C. at pH 5 | $2.7 \times 10^9$ |
| (ix) Polyhexamethylene adipamide treated according to the invention and dyed at 100° at pH 2 | $4.0 \times 10^9$ |

It will be seen from the above table that when typical fabrics woven from yarns of synthetic linear polymeric thermoplastic hydrophobic materials are treated in accordance with the invention the resulting treated fabrics have electrical resistance values between those for cotton and woolen flannel and that these values are retained on prolonged washing or when dyed under typical conditions at or near the boiling point of the dye bath. The finish is thus substantially permanent.

Other tests have demonstrated that the treated materials when subjected to friction do not attract dirt or stain in the same way as do the untreated materials.

The treatment with the cross-linked cationic resin is conveniently carried out in aqueous solution in the presence of a wetting agent, preferably a non-ionic wetting agent. Concentrations of cationic resin of 1–5% by weight are conveniently employed and the pH value of the solution is conveniently 6–9, preferably 7–8. In the case of some materials a pH higher than 9 is permissible depending upon the nature of the synthetic thermoplastic material. The pickup of liquor should be adjusted to a uniform value e.g. 50–100% of the weight of the material after which the solvent is evaporated and the thus treated material subjected to such moderate heat as will not substantially affect the synthetic thermoplastic material whilst thermo-conversion to water-insoluble form is being effected.

Hydrophobic synthtic linear polymeric thermoplastic materials which may be treated as described above in order to modify their tendency to develop electrostatic charges and thus their tendency to soil and stain include the linear polyamides such as polyhexamethylene adipamide and polycaprolactam: linear polyesters such as polyethylene terephthalate; linear polyurethanes such as those derived from a diol and the toluene di-isocyanates and dicyanatodiphenylmethane; linear polymers of ethylenically unsaturated hydrocarbons such as high pressure and low pressure polyethylenes, the linear polypropylenes and linear copolymers of ethylene and propylene; linear polymers and copolymers of other ethylenically unsaturated monomers such as polyvinyl chloride, polyvinylidene chloride, copolymers of vinyl chloride and vinylidene chloride, polyvinyl acetate, copolymers of vinyl acetate and vinyl chloride, copolymers of vinyl acetate and ethylene and/or propylene, polymers of alkyl esters of polyacrylic and polymethacrylic acids such as polymethyl methacrylate and copolymers of methyl methacrylate and n-butyl methacrylate, polyacrylonitrile and polymethacrylonitrile and the polyureas such as polyethylene urea.

The thermoplastic substrates may be used in cast moulded or spun form. As will be apparent textile substrates provide an interesting application for the cationic resins produced by this invention. Nevertheless the resins can be applied to any other form of the substrates when it is desired to diminish their tendency to soil and stain, e.g. to films and foils thereof.

According to an alternative feature of the invention the textile substrate may consist of or contain keratinous fibres such as wool. When a solution of the cationic condensation products is applied to such keratinous fibres, the solvent evaporated and the resulting resinous film converted by heat to water-insoluble form, it is found that a very considerable degree of shrink resistance is conferred thereon. Thus wool tops, woolen yarns and woven and knitted fabrics consisting of or containing wool may be impregnated with the cationic resins prepared in accordance with this invention in amounts of 1–4% of the weight of the material undergoing treatment followed by conversion to water-insoluble form and thus acquire considerable shrink resistance when washed and have a good antistatic finish.

According to a further feature of the invention the cationic condensation products produced in accordance with the process of the invention may be applied to the substrate in the presence of an anion which is sufficiently large to be held within the lattice of the water-insolubilised resinous material formed by the heat treatment. The anion is preferably a polyvalent anion, more especially a divalent anion. Examples of suitable anions are those of the anionic wetting agents such as the alkali metal salts of the alkyl sulphates having ten or more carbon atoms e.g. lauryl sulphate and cetyl sulphate, the alkali metal and ammonium salts of the alkyl benzene sulphonates in which the alkyl group has at least 6, preferably at least 9, carbon atoms and the alkali metal salts of the N-(long chain alkyl and alkenyl) taurines. Materials providing suitable polyvalent anions are the alkali metal salts of the dinaphthylmethane disulphonates and of the dinaphthalene disulphonates. The solvent is then evaporated and the thus treated material heat treated to convert the resin to the water-insoluble form. When the treatment is carried out in this manner uptake of dyestuff during normal washing treatments, irrespective of the nature of the substrate is substantially eliminated. This is assumed to be due to the large anions being sufficiently firmly held within the lattice of the insoluble resin to render replacement by dyestuff anions difficult.

The following examples illustrate the nature of the invention. Throughout the examples the non-ionic wetting agent used was a condensation product of trimethylnonylphenol with 8 moles of ethylene oxide.

Example 1

The cationic water soluble resin was made in the following manner.

(i) Polyethylene glycol (mean molecular weight 1500; 70 parts) was refluxed with thionyl chloride (100 parts) for 2 hours. Removal of the excess of thionyl chloride by distillation under reduced pressure gave polyethylene glycol 1500 ω.ω′-dichloride as a residual oil.

(ii) Adipic acid (290 parts) was added to a stirred solution of diethylene-triamine (225 parts) and water (100 parts). After the acid had dissolved, the solution was heated to 185°–200° C. (bath temperature) and held thereat for 1.5 hours. As much water as possible was removed under reduced pressure at 100° C. to leave a residue of a substantially dry linear polyamide (I).

(iii) The foregoing polyamide (270 parts), polyethylene glycol 1500 ω.ω'-dichloride (120 parts) and potassium hydroxide (3 parts) were dissolved in polyethylene glycol 200 (1100 parts) and the solution stirred at 100° C. for 12 hours. Epichlorohydrin (110 parts) was added and the solution was stirred at 80° C. until the viscosity just reached a point at which air bubbles became trapped in the liquid during the stirring. The solution was then diluted with water to a resin content of 20–25% and the pH value adjusted to 5 with dilute hydrochloric acid.

The application of this resin to woven fabric was carried out in the following manner. The material used was a polyhexamethylene adipamide woven fabric which had been scoured with soap solution to remove the commercial finish, rinsed in water and then dried. The treatment bath was prepared by diluting the foregoing aqueous acid solution of the water soluble cationic resin with water, adding a non-ionic wetting agent and sufficient alkali to obtain an aqueous solution containing 4% by weight of resin and 0.1% non-ionic wetting agent and having a pH of 8.0. The fabric was passed sequentially through a bath of the solution and then through the nip of a pair of rollers, to obtain 100% by weight pick-up of solution. The fabric was then dried at 80°–100% C. for 5–10 minutes, rinsed in running water and again dried.

In order to determine the permanence of the antistatic finish the following additional treatments were carried out.

(a) Portions of the treated rinsed sample were washed with soap solution (2 grams/litre) at 100° C. for 0.5, 1 and 2 hours, rinsed with a continuous stream of cold water for 10 minutes and air dried.

(b) A portion of the treated rinsed sample was washed with soap solution (2 grams/litre) at 60° C. for 6 hours, rinsed with a continuous stream of cold water for 10 minutes and air dried.

(c) A portion of the treated rinsed sample was dyed with 3% of Neolan Blue 2R, 4% of sulphuric acid and 0.5% of highly sulphonated castor oil at a 30:1 liquor ratio (all based upon the weight of the sample). The sample was entered at 50° C., raised to 100° C. during 30 minutes and boiled for 2 hours. The sample was rinsed in water, then in sodium acetate solution (0.5 gram/litre) and finally in running water for 10 minutes and dried.

(d) A portion of the treated rinsed sample was dyed with 3% of Carbolan Brilliant Blue 2 GS, 3% of ammonium acetate, and 0.5% of highly sulphonated castor oil at 30:1 liquor ratio (all based upon the weight of the sample). The sample was entered at 40° C. and the temperature gradually raised to 90° C. during 30 minutes; after maintaining for 30 minutes at 90° C., 3% of glacial acetic acid was added and the solution maintained at 90° C. for a further 30 minutes. The sample was then rinsed in running water for 10 minutes and air dried.

Example 2

The material used was a commercial woven fabric consisting essentially of fibres of polyethylene terephthalate which had been scoured with soap and water to remove the commercial spin finish, rinsed in water, hydro-extracted in a spinner and dried. The treatment bath and treatment was exactly the same as that described in Example 1. The following additional treatments were carried out:

(a) A portion of the treated rinsed sample was washed with soap solution (2 grams/litre) at 100° C. for 2 hours, rinsed with a continuous stream of cold water for 10 minutes and air dried.

(b) A portion of the treated rinsed sample was washed with soap solution (2 grams/litre) at 60° C. for 6 hours, rinsed with a continuous stream of cold water for 10 minutes and air dried.

(c) A portion of the treated rinsed sample was dyed at the boil for 2 hours with 3% of Serilene Dark Blue G, 1% of Dispersol Rubine BT, 2% of Serilene Orange BLW, and 2 ml./litre of trichlorobenzene at 30:1 liquor ratio (all based upon weight of sample). The sample was then placed in a bath containing 2 grams/litre of caustic soda, 2 grams/litre of sodium hydrosulphite and 2 ml./litre of Sunaptol LT (a reduction cleaning assistant) at 60° C. for 20 minutes. The sample was then rinsed in running water for 10 minutes, hydro-extracted and air dried.

Example 3

The material used was a commercially available polymerised acrylonitrile knitted fabric which had been scoured with soap and water to remove the commercial spin finish, rinsed in water, hydro-extracted in a spinner and dried.

The treatment with resin was carried out in the same manner as described in Example 1. The following additional treatments were carried out.

(a) A portion of the treated rinsed sample was washed with soap (2 grams/litre) and water at 100° C. for 2 hours, rinsed with a continuous stream of cold water for 10 minutes, hydro-extracted in a spinner and air dried.

(b) A portion of the treated rinsed sample was washed with soap solution (2 grams/litre) at 60° for 6 hours, rinsed with a continuous stream of cold water for 10 minutes, hydro-extracted in a spinner and air dried.

Example 4

Polyethylene glycol (mean molecular weight 1500; 500 parts) was added during 2 hours to a stirred solution of sodium metavanadate (0.3 part) in 60% nitric acid (315 parts) at 70°. The nitric acid was removed by evaporation under reduced pressure and the residual polyethylene glycol ω.ω'-dicarboxylic acid (35 parts) refluxed with thionyl chloride (50 parts) for 3 hours. The excess of thionyl chloride was removed by distillation under reduced pressure and the residual polyethylene glycol ω.ω'-dicarboxylic acid dichloride obtained as a pale red oil.

The linear polyamide (I) obtained as described in Example 1 (ii), (213 parts) and polyethylene glycol ω.ω'-dicarboxylic acid dichloride obtained as described above (100 parts) were mixed together with stirring at 40° C. After keeping for 10 mins. the product was dissolved in water (500 parts, epichlorohydrin (90 parts) added and the solution stirred at 80° C. until the viscosity reached a point at which air bubbles became trapped in the liquid during the stirring. The solution was then immediately diluted with water to a resin content of 20–25% by weight and the pH adjusted to 5 with hydrochloric acid.

A woven fabric consisting essentially of fibres of polyethylene terephthalate was scoured with soap and water to remove the commercial finish, rinsed in running water and dried. For the application of the water soluble catonic thermosetting resin to this fabric a bath was prepared by diluting the foregoing aqueous acid solution of the resin with water and adding non-ionic wetting agent and sufficient alkali to obtain a solution containing 4% by weight of the resin and 0.1% of non-ionic wetting agent at pH 8. The fabric was passed sequentially through the bath and then through the nip of a pair of rollers adjusted to give a pick-up of liquor of 100% of the weight of the fabric. The fabric was then dried at 80–100° C. for 5–10 minutes, rinsed in water and re-dried.

In order to determine the degree of permanence of the antistatic finish a sample of the thus treated fabric was scoured in 0.2% soap solution at 100° C. for 2 hours, rinsed and dried.

The surface electrical resistances of the samples obtained according to the procedures described in the foregoing Examples 1–4 were determined by conditioning each sample for 24 hours at 20° C. and 65% relative humidity and measuring the resistance of each sample clamped between two copper electrodes 14 cm. long separated by a distance (of sample) of 3 mm. The resistances of cotton and woollen fabrics similarly determined are given for comparison since these in their natural state do not develop an electrostatic charge when subjected to frictional forces.

RESISTANCE MEASUREMENTS ON THE SAMPLES

| Sample: | Resistance (ohms) |
|---|---|
| Woollen flannel | $6.5 \times 10^9 – 5 \times 10^{10}$ |
| Bleached cotton fabric | $1 \times 10^8$ |
| Untreated polyhexamethylene adipamide fabric as used in Example 1 | $>10^{12}$ |
| Untreated polyethylene terephthalate fabric as used in Example 2 | $>10^{14}$ |
| Untreated polyacrylonitrile fabric as used in Example 3 | $>10^{14}$ |

Polyhexamethylene adipamide fabric treated according to Example 1

| | |
|---|---|
| Treated fabric | $1.8 \times 10^9$ |
| (a) Washed for 30 minutes at the boil | $2.4 \times 10^9$ |
| (a) Washed for 1 hour at the boil | $2.4 \times 10^9$ |
| (a) Washed for 2 hours at the boil | $3 \times 10^9$ |
| (b) Washed for 6 hours at 60° C. | $3 \times 10^9$ |
| (c) Dyed under strongly acid conditions at the boil | $4 \times 10^9$ |
| (d) Dyed under slightly acid conditions at 90° C. | $2.7 \times 10^9$ |

Polyethylene terephthalate fabric treated according to Example 2

| | |
|---|---|
| Treated fabric | $3.0 \times 10^9$ |
| (a) Washed for 2 hours at the boil | $2.7 \times 10^9$ |
| (b) Washed for 6 hours at 60° C. | $2.7 \times 10^9$ |
| (c) Dyed at the boil with dye carrier | $1.3 \times 10^{10}$ |

Polyacrylonitrile fabric treated according to Example 3

| | |
|---|---|
| Treated fabric | $2 \times 10^9$ |
| (a) Washed at the boil for 2 hours | $2.9 \times 10^9$ |
| (b) Washed for 6 hours at 60° C. | $2.7 \times 10^9$ |

Polyethylene terephthalate fabric treated according to Example 4

| | |
|---|---|
| Treated fabric | $3.0 \times 10^9$ |
| (a) Washed for 2 hours at the boil | $6.0 \times 10^9$ |

Friction testing of the samples

The anti-static finish effected by the process of the invention is shown by the following experiments.

When a piece of untreated polyhexamethylene adipamide, polyethylene terephthalate or polyacrylonitrile fabric (20 x 20 cm.) is stroked 10 times with a polyethylene ruler and the fabric then presented to a gold-leaf electroscope the leaves open to nearly 180°. The samples of these fabrics treated with resin according to Examples 1–4 when stroked 10 times with the polyethylene ruler effected no appreciable movement of the leaves in the gold-left electroscope.

Soil pickup of the samples

The effect of the anti-static finish on the soiling polyhexamethylene adipamide, polyethylene terephthalate and polyacrylonitrile fabrics treated with the antistatic finish according to Examples 1–4 is shown by the following experiments.

A piece of the untreated fabric 20 x 20 cm. is stroked 10 times with a polyethylene ruler and then held for 1 second over a box 10 x 10 cm. in area and 2 cm. deep containing a layer 1 mm. deep of carbon black particles; the lower surface of the fabric is 1.9 cm. above the layer of carbon black. On removal of the fabric it is seen to be very heavily soiled on its underside with carbon black. Polyhexamethylene adipamide, polyethylene terephthalate and polyacrylonitrile fabrics which have been treated with the resin finish according to Examples 1–4 when submitted to this procedure remain unsoiled.

Removal of soil

The effect of the hydrophilic anti-static finish on the removal of oil and dirt from the soiled fabric is shown by the following experiments.

Samples of treated and untreated polyhexamethylene adipate, polyethylene terephthalate and polyacrylonitrile fabrics were taken and on to each of these was dropped 1 cc. of liquid paraffin containing 1% by weight of an oil-soluble dye. After 5 minutes the fabrics were all immersed in water at 20° C. and moved gently to and fro through the liquor. The coloured oil drop on each of the treated fabrics floated off the fabric within 1 minute leaving the fabric clean. The untreated fabrics remained heavily stained with oil after 30 minutes.

Example 5

A cationic water soluble resin solution of 20–25% resin content was made in the manner described in Example 1. The textile materials used were polyhexamethylene adipamide and polyethylene terephthalate woven fabrics which had been scoured with soap solution to remove the commercial spin finish, rinsed in water and then dried.

The treatment bath was prepared by diluting the foregoing aqueous acid solution of the water-soluble cationic resin with water, adding non-ionic wetting agent, alkali, and sufficient of a disodium dinaphthalene disulphonate (e.g. Parvol ES) to obtain an aqueous solution having a pH of 10.0, and containing 3% by weight of resin, 0.1% of non-ionic wetting agent and 6% by weight of disodium dinaphthalene disulphonate.

The fabric was passed sequentially through a bath of the solution and then through the nip of a pair of rollers to obtain 100% by weight pick-up of solution. The fabric was then dried and heat cured at 80°–100° C. for 5–10 minutes, rinsed in running water and again dried.

In order to determine the resistance to dye pick-up of the thus treated fabrics the following treatment was carried out. Portions of the treated rinsed samples together with a sample of wool which had been dyed to a heavy red shade with 3% Polar Red RL and 1% Polar Brilliant Red G, were washed with 0.5% soap solution at 50° C. for 0.5 hr. The samples were then rinsed and dried. The washed polyhexamethylene adipamide and polyethylene terephthalate fabric samples were white and had not picked up any red dye from the wash liquors.

Example 6

The material used was a light-weight woollen flannel. The treatment bath was prepared by diluting the aqueous acid solution of the water soluble cationic resin prepared as described in Example 1 with water, adding a non-ionic wetting agent and sufficient alkali to obtain an aqueous solution containing 3% by weight of the cationic resin and 0.1% of non-ionic wetting agent having a pH of 7.0.

The fabric was passed sequentially through a bath of the solution and then through the nip of a pair of rollers to obtain 100% by weight pick-up of solution. The fabric was then dried at 80–100° C. for 5–10 minutes, rinsed in running water and again dried.

In order to determine the degree of shrink resistance conferred upon the woollen flannel, samples of treated and untreated material were washed in the Cubex machine for 60 and 120 minute periods.

| Sample | Equilibration, percent | | 60 min. felting, percent | | 120 min. felting, percent | | Total shrinkage, percent | |
|---|---|---|---|---|---|---|---|---|
| | Width | Length | Width | Length | Width | Length | Width | Length |
| Untreated control | 4.3 | 3.6 | 10.2 | 11.3 | 16.3 | 17.0 | 20.6 | 20.6 |
| Treated with 3% by weight of resin finish | 0.7 | 0.7 | 0.2 | 1.0 | 1.5 | 1.0 | 2.2 | 1.7 |

The Cubex machine and its method of use are described by L. R. Gan, Textile Research Journal, vol. 34, pages 945–953 (1964).

We claim:

1. A water-soluble cationic resinous condensation product prepared by a process which comprises:
   (1) reacting in the presence of an acid acceptor and at a reaction temperature (A) a linear water-soluble aliphatic polyamide prepared by heating together at a reaction temperature (a) at least one polyalkylene polyamine having 2 to 8 alkylene groups and (b) 0.8 to 1.2 mols per mol of said amine of a reactive form of an alkane dicarboxylic acid having 3 to 10 carbon atoms, and (B) a linear polyoxyalkylene compound having the formula $$X^2\text{—}CHR^1\text{—}(OCHR\text{—}CHR^1)_n\text{—}OCHRX^3$$

in which $n$ is an integer from 5 to 50, $X^2$ is a group having one of the formulae —CHRZ, —COZ, —CHROCOCl and —CHROCH$_2$·CH(OH)·CH$_2$Cl, $X^3$ is a group having one of the formulae —CHR$^1$Z, —COZ, —CHR$^1$O·COCl and $$\text{—}CHR^1OCH_2\cdot CH(OH)\cdot CH_2Cl$$

R and R$^1$ are selected from the group consisting of hydrogen and hydrocarbon groups having 1 to 7 carbon atoms which are free from olefinic and acetylenic unsaturation and Z is a halogen atom, said polyoxyalkylene compound being used in an amount sufficient to react with 5 to 50% of the secondary amino groups present in said linear polyamide and said polyoxyalkylene compound having a molecular weight in the range of 100 to 2500; and
   (2) heating the resulting condensation product containing 50–95% of the secondary amino groups originally present in said linear polyamide with epichlorohydrin at 40–90° C., the mole ratio of epichlorohydrin to secondary amino groups being 1–1.5:1 and terminating the heating while the resulting cationic resinous condensation product is soluble in water.

2. A product as claimed in claim 1 in which said polyoxyalkylene compound is used in an amount sufficient to react with 15 to 25% of the secondary amino groups present in said linear polyamide.

3. A product as claimed in claim 1 in which R and R$^1$ are selected from hydrogen atoms and lower alkyl groups.

4. A product as claimed in claim 1 in which the ultimate water-soluble reaction product is further reacted with a quaternising agent.

5. A product as claimed in claim 1 in which the ultimate water-soluble reaction product is diluted with water to form a 20 to 25% by weight solution thereof and the pH value of the resulting solution adjusted to within the pH range 5 to 6.

6. A process for imparting an antistatic finish to a hydrophobic synthetic linear polymeric thermoplastic material which comprises coating the surface of such a material with a solution of a water-soluble cationic resinous condensation product according to claim 1, evaporating the solvent present and heating to convert the condensation product to water-insoluble form.

7. A process as claimed in claim 6 in which the water-soluble cationic resinous condensation product employed has been further reacted with a quaternising agent.

8. A process as claimed in claim 6 in which the water-soluble cationic resinous condensation product employed has been diluted to form a 20 to 25% by weight solution thereof and the pH value of the resulting solution adjusted to within the pH range 5 to 6.

9. A process for the production of a shrink-resistant keratinous material which comprises coating the surface of such a material with a water-soluble cationic resinous condensation product according to claim 1, evaporating the solvent present and heating to convert the condensation product to water-insoluble form.

10. A process as claimed in claim 9 in which the water-soluble cationic resinous condensation product employed has been further reacted with a quaternising agent.

11. A process as claimed in claim 9 in which the water-soluble cationic resinous condensation product has been diluted to form a 20 to 25% by weight solution thereof and the pH value of the resulting solution adjusted to within the pH range 5 to 6.

References Cited

UNITED STATES PATENTS

| 3,240,761 | 3/1966 | Keim et al. | |
| 3,382,096 | 5/1968 | Boardman | 117—139.5 |
| 3,405,104 | 10/1968 | Wakeman et al. | 260—29.2 |

MURRAY TILLMAN, Primary Examiner

M. J. TULLY, Assistant Examiner

U.S. Cl. X.R.

117—138, 139; 260—78, 857